United States Patent
White et al.

(10) Patent No.: US 10,114,406 B2
(45) Date of Patent: Oct. 30, 2018

(54) COUNTERBALANCE UNIT

(71) Applicant: BAE SYSTEMS plc, London (GB)

(72) Inventors: Nicholas James White, Rochester (GB); Robert Maxwell Wasson, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/901,750

(22) PCT Filed: Jun. 27, 2014

(86) PCT No.: PCT/GB2014/051968
§ 371 (c)(1),
(2) Date: Dec. 29, 2015

(87) PCT Pub. No.: WO2015/001319
PCT Pub. Date: Jan. 8, 2015

(65) Prior Publication Data
US 2016/0357216 A1  Dec. 8, 2016

(30) Foreign Application Priority Data

Jul. 1, 2013 (EP) .................................... 13275147
Jul. 1, 2013 (GB) .................................. 1311750.2

(51) Int. Cl.
| G05G 9/047 | (2006.01) |
| G05G 25/02 | (2006.01) |
| F16F 7/01  | (2006.01) |
| B64C 13/10 | (2006.01) |

(52) U.S. Cl.
CPC ............. *G05G 25/02* (2013.01); *B64C 13/10* (2013.01); *F16F 7/015* (2013.01); *G05G 9/047* (2013.01)

(58) Field of Classification Search
CPC ...... G05G 25/02; F16F 7/015; F16H 59/0208; F16H 2061/246
See application file for complete search history.

(56) References Cited

U.S. PATENT DOCUMENTS

| 3,990,535 | A | * | 11/1976 | Bruce | ................... B60K 20/04 181/207 |
| 4,689,449 | A | * | 8/1987 | Rosen | ................ G05G 9/04796 200/6 A |
| 5,027,715 | A | * | 7/1991 | Moore | .................. B61B 10/022 104/172.2 |
| 6,201,196 | B1 | | 3/2001 | Wergen | |

(Continued)

FOREIGN PATENT DOCUMENTS

| FR | 2317122 A1 | 2/1977 |
| JP | H03193531 A | 8/1991 |

(Continued)

OTHER PUBLICATIONS

International Preliminary Report on Patentability received for Patent Application No. PCT/GB2014/051968, dated Jan. 14, 2016, 6 pages.

(Continued)

*Primary Examiner* — Jake Cook
(74) *Attorney, Agent, or Firm* — Finch & Maloney PLLC

(57) ABSTRACT

A vibration damping counterbalance unit for an inceptor apparatus having a wall defining a cavity; and a plurality of vibration damping masses housed within the cavity.

15 Claims, 5 Drawing Sheets

(56) References Cited

U.S. PATENT DOCUMENTS

| | | | | |
|---|---|---|---|---|
| 6,547,049 | B1* | 4/2003 | Tomlinson | F01D 25/04 |
| | | | | 188/379 |
| 6,802,405 | B2* | 10/2004 | Barcock | F16F 7/015 |
| | | | | 188/268 |
| 2003/0013322 | A1* | 1/2003 | Choy | B65G 47/904 |
| | | | | 438/800 |
| 2009/0229396 | A1* | 9/2009 | Taylor | B64C 13/04 |
| | | | | 74/471 XY |
| 2010/0320046 | A1* | 12/2010 | Provost | F16F 7/116 |
| | | | | 188/380 |
| 2012/0024646 | A1* | 2/2012 | Tsugihashi | F16F 7/015 |
| | | | | 188/268 |
| 2012/0064288 | A1* | 3/2012 | Nakano | A61F 2/3662 |
| | | | | 428/117 |

FOREIGN PATENT DOCUMENTS

| | | |
|---|---|---|
| SU | 1428873 A2 | 10/1988 |
| SU | 1456654 A1 | 2/1989 |
| WO | 2007132267 A1 | 11/2007 |
| WO | 2015001319 A1 | 1/2015 |
| WO | 2015001320 A1 | 1/2015 |

OTHER PUBLICATIONS

International Search Report and Written Opinion received for Patent Application No. PCT/GB2014/051968, dated Aug. 4, 2014, 8 pages.
GB Intellectual Property Office Search Report under Section 17(5) received for GB Patent Application No. 1311750.2 dated Dec. 20, 2013. 3 pages.
Extended European Search Report received for EP Patent Application No. 13275147.0 dated Jan. 3, 2014. 6 pages.

* cited by examiner

COUNTERBALANCE UNIT

The present disclosure relates to a counterbalance unit.

In particular it relates to a vibration damping counterbalance unit for an inceptor apparatus for operating a machine.

Controlling machines while they are operating can be complicated by forces generated by the operation of the machine itself. A machine having a control lever (for example, an inceptor, or "joy stick") may vibrate such that an operator has difficulty moving the lever to a desired position. If the machine is in motion, for example because it is a land, sea or air vehicle, the problem is further complicated by acceleration forces due to the maneuvers performed by the vehicle. One area of particular concern is how the apparatus for steering the vehicle might be affected by vehicle motion, for example vehicles using an inceptor (or "stick", such as that commonly used to steer an aircraft). If the vehicle is subjected to buffeting, changes in direction that result in acceleration forces that act on the inceptor, or mechanical vibration, then the operator may find it increasingly difficult to control the vehicle.

Conventional means of containing acceleration forces is to mass balance the inceptor. Usually this is achieved by adding a mass of a solid dense metal (for example tungsten) at the opposite end of the stick from a grip portion handled by the user. This is known as "passive mass balancing".

FIG. 1 shows a stick apparatus 10. The inceptor comprises a stick housing 11 and a stick control member 12, which are arranged such that the stick control member 12 is pivotally mounted to the stick housing 11 at pivot point 13. The pivot point 13 acts to divide the stick control member 12 into a first member section 14, contained within the stick housing 11, and a second member section 15, external to the stick housing 11. Normally, the stick housing 11 is fixed to a vehicle 31 carrying the active stick apparatus 10. The pivot point 13 allows the stick control member 12 to pivot with respect to the stick housing 11, as indicated by directional arrows 16 and 17. A gaiter 18 can be provided between the second member section 15 and stick housing 11 to inhibit ingress of unwanted foreign material into the stick housing 11. At the one end of the second member section 15, distal from the pivot point 13, there is provided a grip 19 suitable for engagement by an operator of the stick apparatus 10, so that the operator can move the stick control member 12 in either direction shown by directional arrow 16.

Also attached to the first member section 14, between the solid mass 20 and the pivot point 13, is a first link 21. A first end 22 of the first link 21 is pivotally coupled to the first member section 14 and a second end 23 is pivotally coupled to a second link 24. The second link 24 being pivotally attached to the first link 21 at a first end 25 and a second end 26 of the second link 24 is fixedly attached to an output drive axle 27 of an output sensor 28. The output sensor 28 further comprises a housing 29 which is fixedly attached to the stick housing 11. The output sensor 28 translates stick position to signals indicative of directional commands to a control unit (e.g. flight computer, not shown).

A solid mass 20 is attached to the first member section 14 at an end distal from the pivot point 13. The solid mass 20 is arranged to act as a counterbalance to movement of the stick control member 12 about pivot point 13 under external acceleration forces exerted on the stick control member 12 and associated grip 19.

Such an arrangement is capable of balancing acceleration forces. However, the inceptor may suffer from vibration resonance, especially if the inceptor is a "long pole" arrangement, that is to say, the interface grip 19 on the inceptor is located a relatively large distance from its pivot point 13.

Hence an inceptor apparatus which can compensate for inertial forces and vibration forces is highly desirable.

SUMMARY

Accordingly there is provided a vibration damping counterbalance unit for an inceptor apparatus comprising: a wall defining a cavity; and a plurality of vibration damping masses housed within the cavity.

The cavity may be configured such that the vibration damping masses are free to move in any direction relative to the cavity wall and each other.

The vibration damping masses may be substantially spherical. The vibration damping masses may comprise a metal having a density of at least 15 g/cm$^3$. The vibration damping masses may have a Vickers hardness of at least 2600 MPa.

The vibration damping masses may substantially comprise a tungsten alloy.

The vibration damping masses may have a diameter of at least 2.0 mm but no greater than about 5.0 mm. The diameter of the vibration damping masses may be a function of: required total counterbalance mass, density of vibration mass material, maximum allowable vibration damping counterbalance unit envelope, and desired free space volume in the cavity.

The free space volume in the cavity may be at least 15% of the volume of the cavity.

The vibration damping counterbalance unit according to the present disclosure may comprise only one cavity which houses vibration damping masses. The vibration damping counterbalance unit according to the present disclosure may comprise at least one internal dividing wall to define at least one additional cavity to house vibration damping masses.

There may be provided a control stick for an inceptor apparatus provided with a vibration damping counterbalance unit according to the present disclosure. The vibration damping counterbalance unit may be removeably fixed to the control stick.

There may be provided an inceptor apparatus comprising a control stick as according to the present disclosure. The control stick may be pivotably mounted such that it may move in at least one of a first direction and second direction, the second direction being at right angles to the first direction.

Hence there is provided an inceptor apparatus in which mass balancing and vibration damping may be achieved.

BRIEF DESCRIPTION OF THE DRAWINGS

Examples of the present disclosure will now be described with reference to the accompanying drawings, in which.

DETAILED DESCRIPTION

Figure 1:
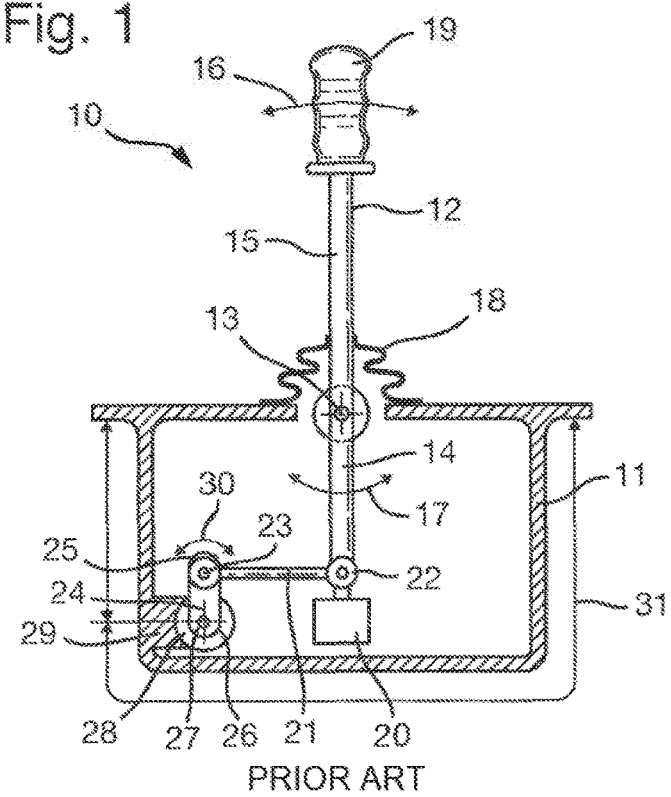
FIG. 1 shows a conventional mass balanced inceptor.
Figure 2:
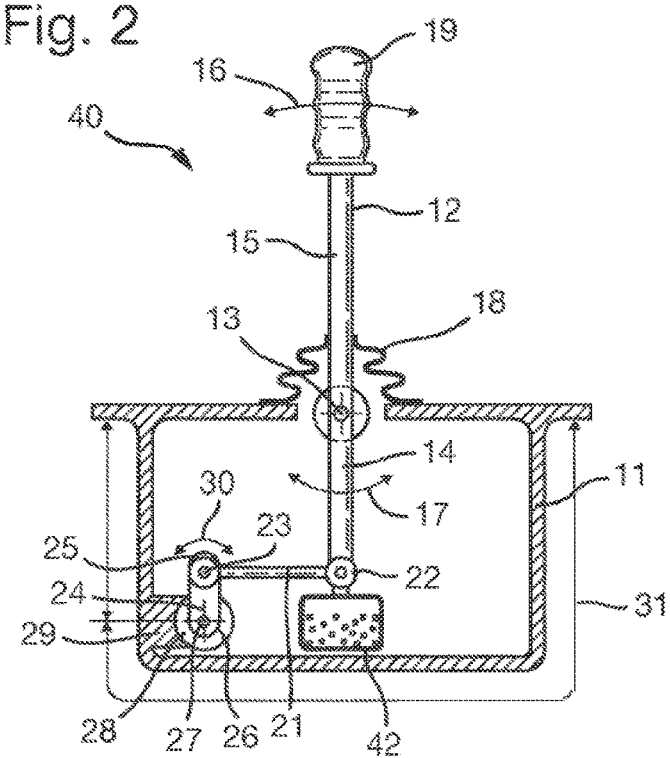
FIG. 2 shows a cross sectional view of the vibration damping counterbalance unit of the present disclosure attached to a control stick.

FIG. 2 shows an inceptor apparatus 40 comprising a vibration damping counterbalance unit 42 according to the present disclosure. The inceptor of apparatus 40 is shown as being identical to that of the known apparatus 10 shown in FIG. 1, with the exception that the solid mass 20 is replaced by the vibration damping counterbalance unit 42 of the present disclosure. However, the structure of the inceptor apparatus 40 shown is not intended to be limiting on the applications to which the counterbalance unit 42 may be applied. That is to say, other inceptor apparatus of different configurations may also be fitted with a counterbalance unit 42 according to the present disclosure.

Figure 3:
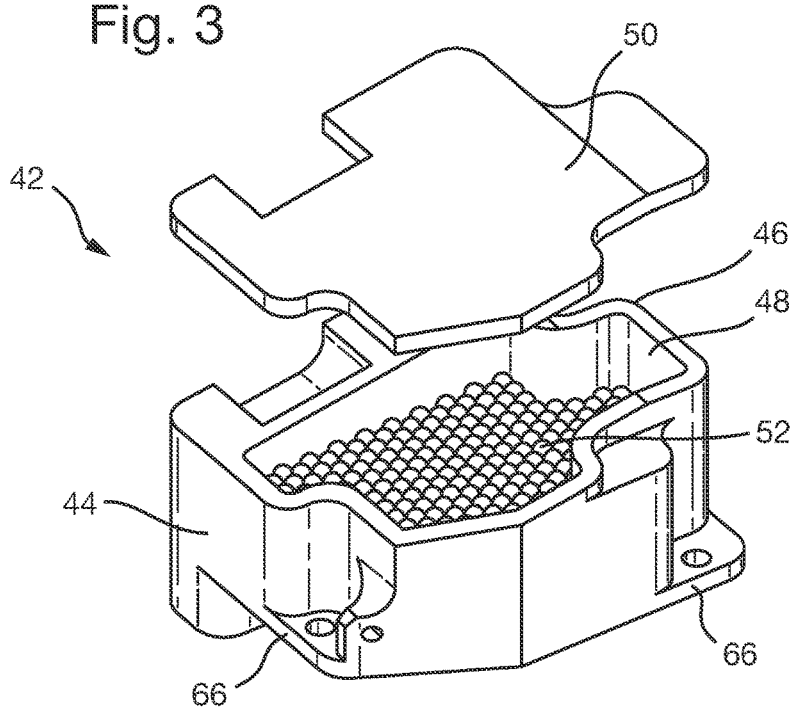
FIG. 3 shows a part exploded view of the counterbalance unit as shown in FIG. 2.

FIG. 3 shows a part exploded view of one example of the vibration damping counterbalance unit 42. The unit 42 has a housing 44 with a wall 46 which defines a cavity 48. A lid 50 is provided to close the cavity 48. The lid member 50 may be attached to the housing 44 by any appropriate means, for example, a semi-permanent fixing, for example screws and bolts, or by a more permanent fixing such as welding or other bonding method.

Provided in the cavity 48 are a plurality of vibration damping masses 52. As can be seen in FIG. 3, the vibration damping masses 52 fill only part of the cavity volume 48. In one example, the free space volume in the cavity is at least 15% of the total volume of the cavity 48. That is to say, at most 85% of the volume of the cavity 48 is filled with the vibration masses 52. The cavity 48 is configured such that the damping masses 52 are free to move in any direction relative to the wall 46 and in any direction relative to each other, within the limits of the cavity 48 defined by the wall 46.

As in the example shown, the vibration damping masses 52 are substantially spherical.

The vibration damping masses 52 may substantially comprise a metal having a high density. In one example, the vibration damping masses may have a density of at least 15 g/cm³. The vibration damping masses may have a Vickers hardness of at least 2,600 MPa.

The vibration damping masses 52 may substantially comprise a tungsten alloy. That is to say the vibration damping masses 52 may be manufactured in part from a tungsten alloy, or manufactured exclusively from a tungsten alloy. For example, the vibration damping masses may comprise a tungsten alloy comprising Tungsten (W), Nickel (Ni), Iron (Fe) or copper (Cu). Hence the material of the vibration damping masses may be manufactured to the requirements of MIL-T-21014. Alternatively, the vibration damping masses may comprise a stainless steel alloy.

The vibration damping masses 52 may have a diameter of at least 2.0 mm but no greater than 5.0 mm. Preferably the vibration damping masses 52 may have a diameter of at least 2.2 mm but no greater than 4.83 mm. Any smaller than about 2.0 mm the vibration damping masses become difficult to handle during assembly, and can become lodged in undesirable locations (for example screw threads). That is to say, below a diameter of about 2 mm, the vibration damping masses may become a Foreign Object Damage risk to the vehicle. With a diameter greater than about 5 mm, the mass per unit volume of the masses in the housing may reduce to an undesirable value, as there will become a considerable amount of space between touching masses, thus requiring a larger counterbalance unit 52 to achieve the same amount of balance and damping than for a unit comprising vibration damping masses of a smaller diameter.

The volume of the vibration damping masses 52 is chosen taking into account the counterbalance mass required, the density of the chosen vibration mass 52 material, the maximum allowable counterbalance unit envelope, and the desired free space volume in the cavity 48. The counterbalance unit envelope is the allotted space in the inceptor apparatus for the counterbalance unit 42. In examples where the vibration masses are spherical, obviously the volume relates directly to vibration mass diameter.

Figure 4:
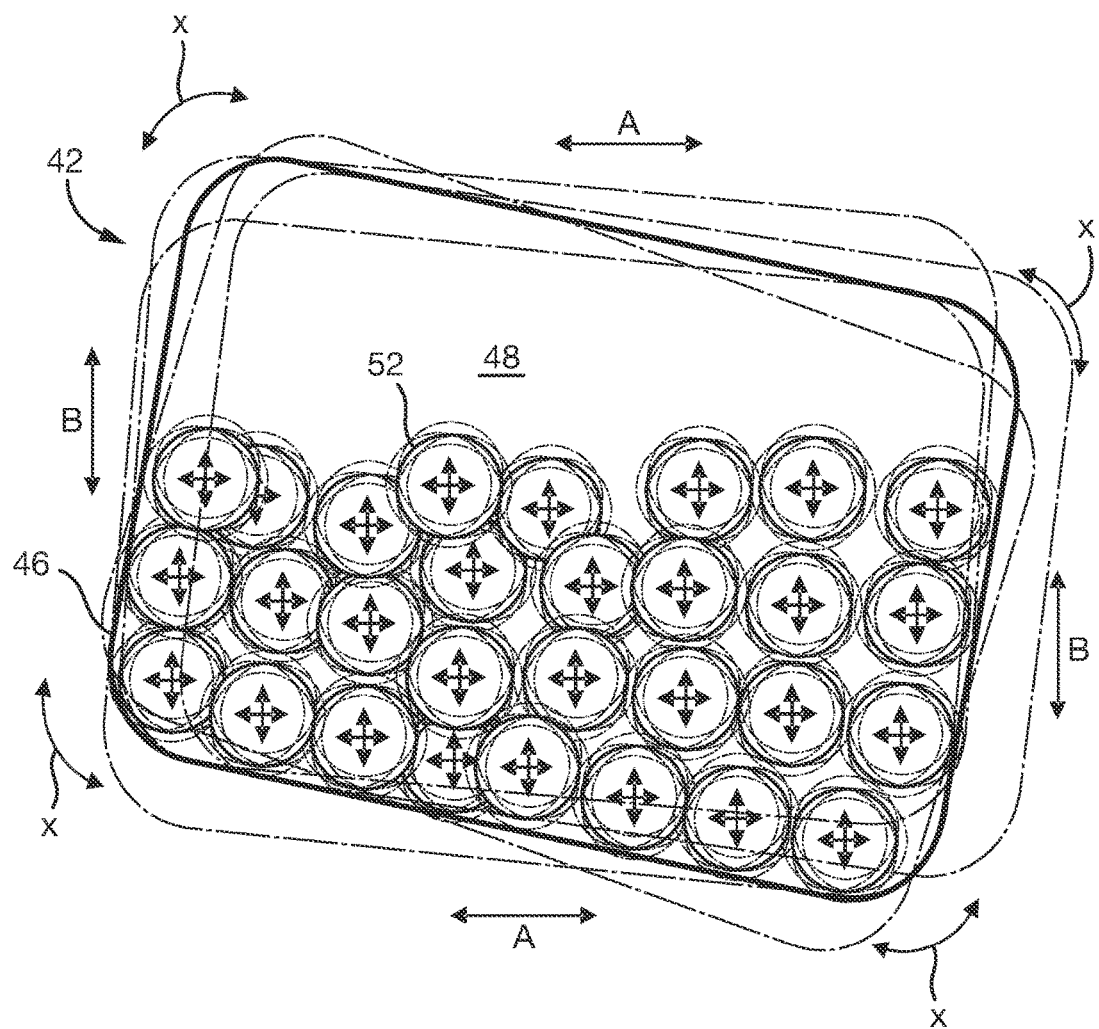
FIG. 4 shows a cross sectional view of the counterbalance unit whilst experiencing various vibrational modes.
Figure 5:
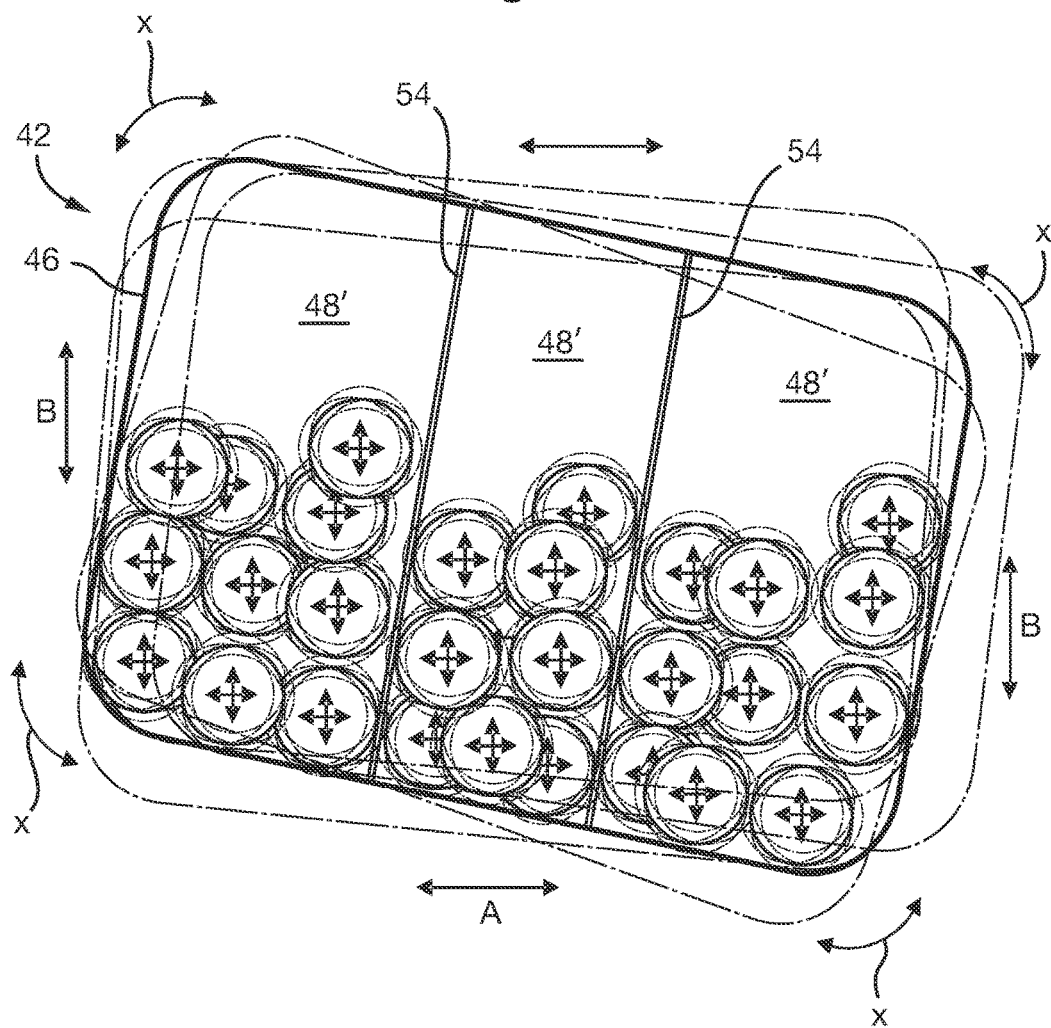
FIG. 5 shows an alternative example of a counterbalance unit to that shown in FIG. 4.

The examples of FIGS. 3,4 show a counterbalance unit 42 having only one cavity 42 which houses the vibration damping masses 52. An alternative counterbalance unit 42' with a plurality of internal cavities 48' to house vibration damping masses 52 is shown in FIG. 5. In such an arrangement, there may be provided at least one internal dividing wall 54 to define at least one additional cavity 48' to house vibration damping masses 52. There may be provided a plurality of internal walls 54 to define a plurality of additional cavities 48' to house vibration damping masses 52.

The volume of the cavity 48 (or cavities 48') of the housing 44 must be sufficient to accommodate the required number of masses 52, and allow them free movement within the cavity 48 (or cavities 48'). The vibration damping masses 52 must be able to move (for example roll or vibrate) around the inside of the internal cavity 48 of the housing 44, that is to say, from side to side and/or up and down inside the internal cavity 48 or cavities 48' of the housing 44. At the very least, the masses 38 must be able to move (for example roll and/or vibrate) at least part of the distance from one end/side of the internal cavity 48 to the other end/side of the internal cavity 48. Put another way, the discrete masses 52 are arranged, and the cavity configured, such that the discrete masses are free to move and vibrate relative to one another in three dimensions.

Given the inherent lack of space in inceptor apparatus, and hence the need for the vibration damping counterbalance unit 42 to occupy a relatively small volume, generally a vibration mass material of high density is most appropriate. Additionally, it has been found that vibration damping masses of relatively small diameter are effective in damping out a wider range of frequencies. This is beneficial since vehicles, and in particular aircraft, are commonly subject to a broad range of vibrations.

Figure 6:
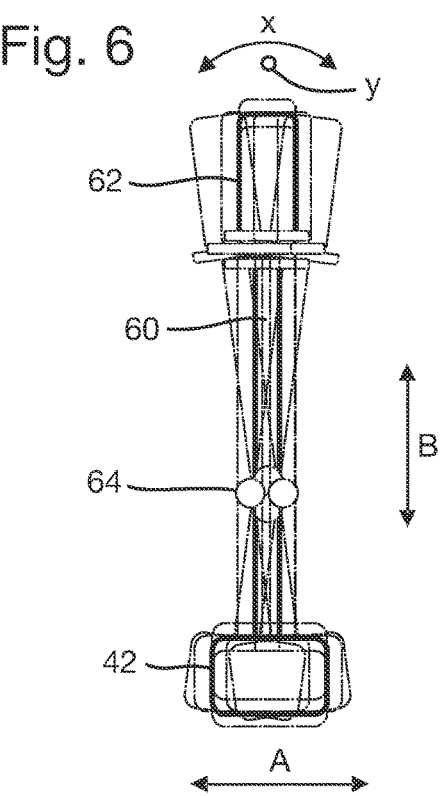
FIG. 6 shows a view of the control stick and counterbalance unit of FIG. 2 in different vibrational angular positions.

As stated above, and shown in FIG. 2 and FIG. 6, the inceptor apparatus 40 comprises a control stick 60 provided with the counterbalance unit 42, which may be removably fixed to the control stick 60. With reference to the example shown in FIG. 3, the counterbalance unit 42 may be attached to a control stick 60 by holes in flanges 66 provided on the housing 44. However, any means of attachment of the unit 42 to the control stick 60 may be used, for example by welding and/or other fixatives. Alternatively, the counterbalance unit 42 may be formed integrally with the stick member 60.

In FIG. 6 there is shown a grip portion 62 of the control stick 60 fitted to one end of the control stick 60, and the vibration damping counterbalance unit 42 provided at the opposite end of the control stick 60. There is a pivot point 64 about which the control stick 60 may be pivoted. That is to say the control stick 60 is pivotably mounted about the pivot point 64 such that it may move in at least one of a first direction and second direction, the second direction being at right angles to the first direction. The first direction may be an "x" direction as shown in FIG. 6, or may be a "y" direction which is effectively in and out of the page as shown in FIG. 6, and represented as a dot. In this way, in use, the control stick may control an aircraft in pitch and roll directions.

The vibration damping counterbalance unit 42 may be any appropriate shape. As shown in FIG. 3, the unit 42 has an irregular shape. However, the unit 42 may also be provided with a polygonal cross section, as shown FIG. 4 onwards.

The housing 44 may be manufactured from any appropriate material, but is preferably manufactured from stainless steel or a Tungsten alloy FIG. 6 shows the control stick and counterbalance unit 42 in operation. The solid black lines define the structure of the device, and the dotted lines indicate positions which the control stick assembly may occupy during operation. That is to say, that the dotted lines indicate vibration, which may be from left to right as shown by arrow "A", or may be up and down as shown in the figure as indicated by arrow "B", or may be from side to side as shown by arrow "x" and point "y", which indicates the direction at right angles to the direction as indicated by arrow "x".

Figure 7:
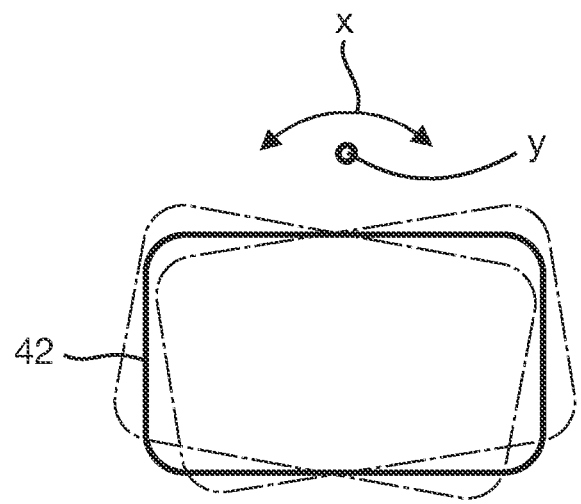
FIG. 7 and FIG. 8 show views indicative of vibrational modes of the counterbalance unit.
Figure 8:
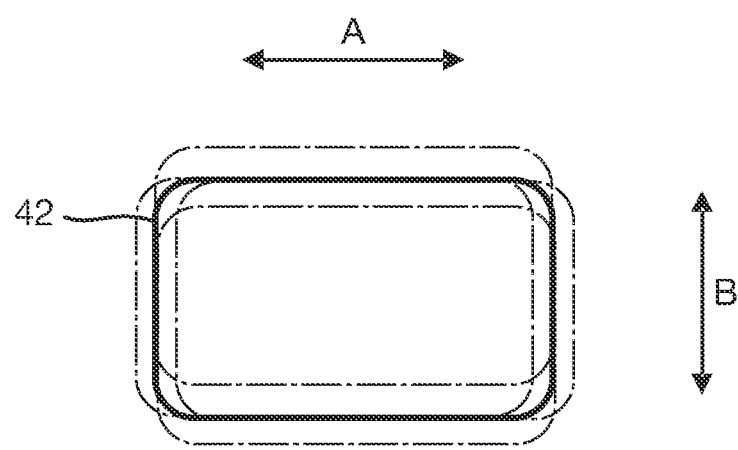

This is shown in more detail in FIG. 7 and FIG. 8, which shows just the outer outline of the vibration damping counterbalance unit 42. This also applies to the alternative arrangement counterbalance unit 42' shown in FIG. 5. The dotted line shown in FIG. 7 shows the different positions through which the counterbalance unit may rotate in the "x" and "y" directions. In FIG. 8 the counterbalance unit 42 is shown with dotted lines indicating the up and down (arrow "B") and left and right (arrow "A") position that the counterbalance unit 42 may occupy whilst vibrating.

FIG. 4 shows a cross sectional view which reveals the inside of the counterbalance unit 42 when vibrating as in FIGS. 6, 7, 8. The vibration damping masses 52 are shown vibrating up and down left and right and rotationally in the "x" and "y" directions. The dotted line surrounding the solid lines of the vibration damping masses 52 indicate the vibration being experienced by the vibration damping masses 52.

The alternative unit 42' with internal partitions 54, shows how the vibration damping elements 52 may be arranged and vibrate in such an example of the present disclosure.

The multiple masses 52 are free to move in all three axes under the effect of vibration, and hence provide vibration damping in all three axes. This creates a non-linear damping element. When vibrated, the discrete masses 52 are free to react in a "random" nature they act to damp out the magnitude of the resonance induced by the input frequency. This reduction has a significant beneficial impact on the vibration amplitude magnification factor being applied to the mechanism.

The vibration damping counterbalance unit 42 will also act to mass balance the stick 60 in a conventional manner.

Hence there is provided a system in which mass balancing and vibration damping of the control stick 60 is achieved in multiple axes, for example two or more axes. Hence vibration induced from any direction will be damped by a device according to the present invention.

The vibration damping counterbalance unit of the present disclosure has particular efficacy when incorporated into an inceptor apparatus for an aircraft.

The design of the present application can be applied to all inceptor designs where a counterbalance is required, and may be retrofitted to existing inceptors.

The resulting reduction in response to vibration of the arrangement of the present disclosure has a significant and beneficial effect on component fatigue life, bearing wear and gearbox loading. This invention can be applied to all inceptor designs where a counterbalance is required.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An inceptor apparatus for an aircraft, the apparatus comprising:
   a control stick having a grip portion at one end of the control stick; and
   a vibration damping counterbalance unit operatively coupled to an end of the control stick opposite the end having the grip portion, the vibration damping counterbalance unit including a wall defining a cavity, and a plurality of vibration damping masses housed within the cavity,
   wherein the control stick is configured to pivot about a point between each end of the control stick.

2. The inceptor apparatus as claimed in claim 1, wherein the cavity is configured such that the vibration damping masses are free to move in any direction relative to the cavity wall and each other.

3. The inceptor apparatus as claimed in claim 1, wherein the vibration damping masses are substantially spherical.

4. The inceptor apparatus as claimed in claim 1, wherein the vibration damping masses comprise a metal having a density of at least 15 g/cm$^3$.

5. The inceptor apparatus as claimed in claim 1, wherein the vibration damping masses have a vickers hardness of at least 2600 MPa.

6. The inceptor apparatus as claimed in claim 1, wherein the vibration damping masses substantially comprise a tungsten alloy.

7. The inceptor apparatus as claimed in claim 1, wherein the vibration damping masses have a diameter of at least 2.0 mm but no greater than about 5.0 mm.

8. The inceptor apparatus as claimed in claim 1, wherein a diameter of at least one of the vibration damping masses is a function of a counterbalance mass, a density of vibration mass material forming at least one of the vibration damping masses, a vibration damping counterbalance unit envelope, and a free space volume in the cavity.

9. The inceptor apparatus as claimed in claim 1, wherein only one cavity houses the vibration damping masses.

10. The inceptor apparatus as claimed in claim 1, further comprising at least one internal dividing wall to define at least one additional cavity to house vibration damping masses.

11. The inceptor apparatus as claimed in claim 1, wherein the vibration damping counterbalance unit is removeably fixed to the control stick.

12. The inceptor apparatus as claimed in claim 1, wherein the control stick is pivotably mounted such that it may move in at least one of a first direction and second direction, the second direction being at right angles to the first direction.

13. The inceptor apparatus as claimed in claim 1, wherein free space volume in the cavity is at least 15% of the volume of the cavity.

14. The inceptor apparatus as claimed in claim 1, wherein the cavity includes an internal dividing wall defining at least one additional cavity to house vibration damping masses.

15. The inceptor apparatus as claimed in claim 1, wherein the vibration damping counterbalance unit is removeably fixed to the control stick.

* * * * *